March 10, 1959 H. W. AUSTROW ET AL 2,876,916
CABLE REEL HANDLING APPARATUS
Filed Aug. 24, 1956 4 Sheets-Sheet 1

Inventors:
Harold W. Austrow
Don May, Jr.
Otto A. Neumann
and Emil M. Szten
By Frank C. Parker Atty.

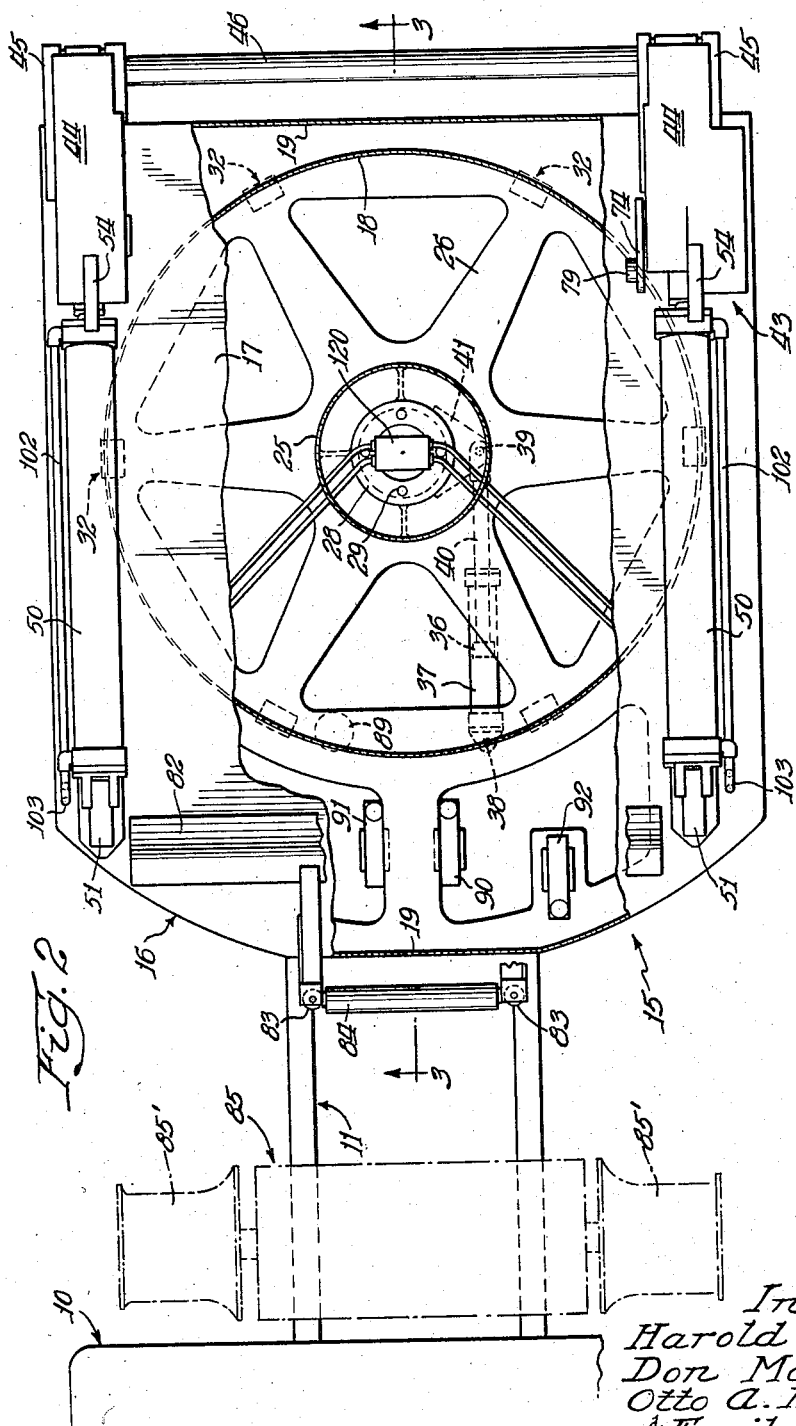

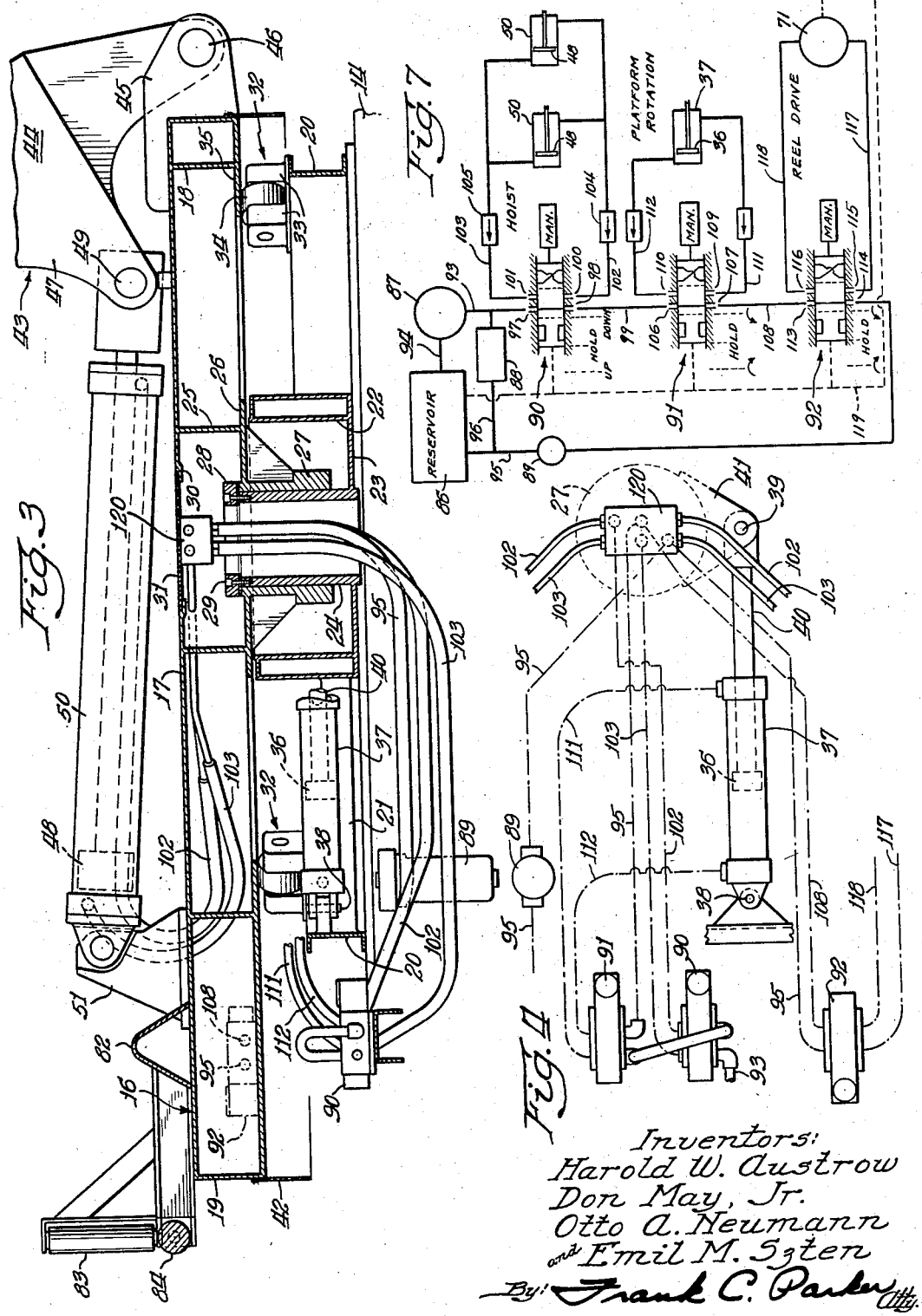

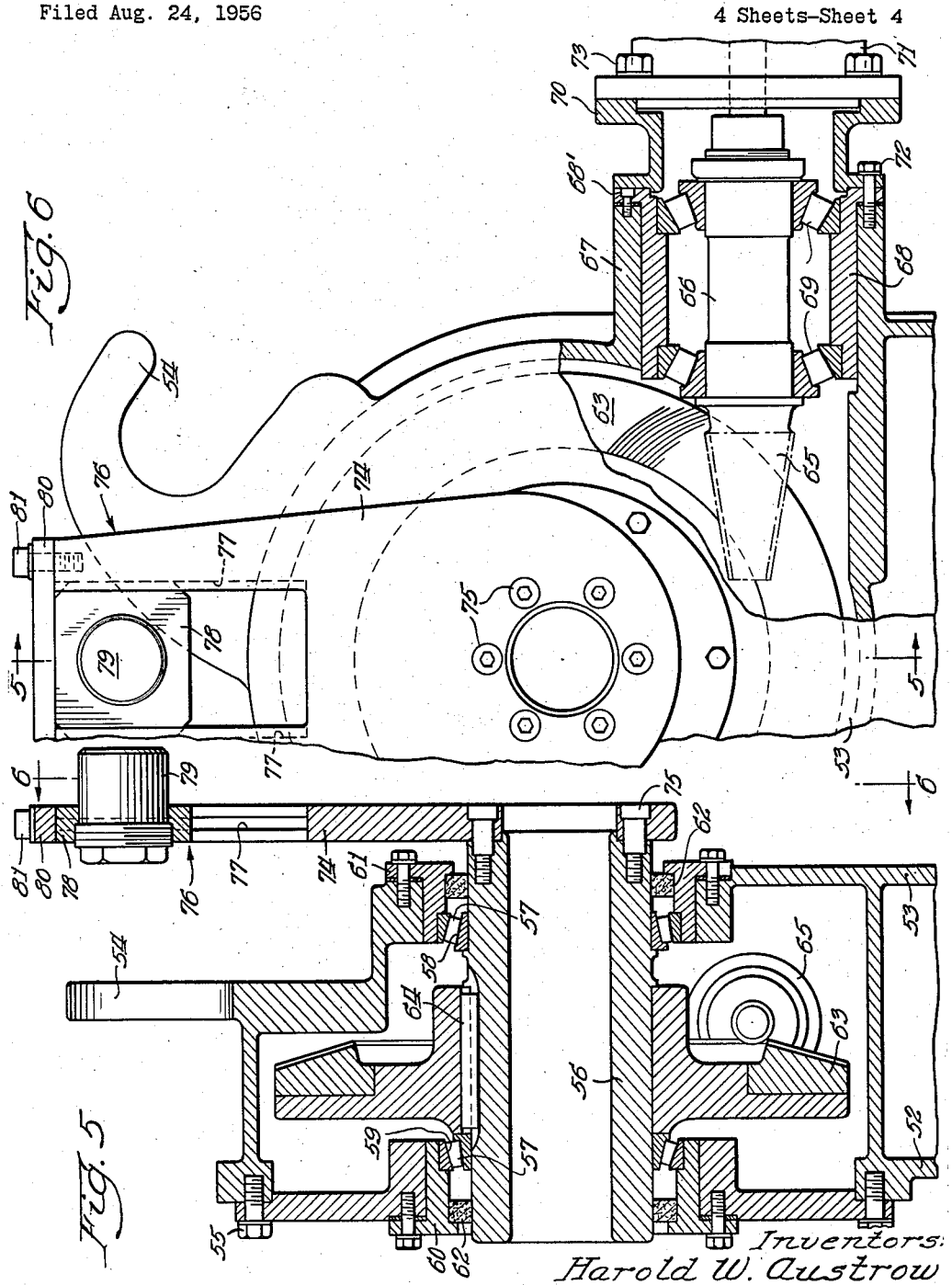

United States Patent Office 2,876,916
Patented Mar. 10, 1959

2,876,916

CABLE REEL HANDLING APPARATUS

Harold W. Austrow, Don May, Jr., Otto A. Neumann, and Emil M. Szten, Kalamazoo, Mich., assignors to Borg-Warner Corporation, Chicago, Ill., a corporation of Illinois Application August 24, 1956, Serial No. 606,055

6 Claims. (Cl. 214—77)

The present invention relates generally to material handling apparatus and is particularly concerned with that class of material handling apparatus adapted to be mounted on a chassis of a truck for the purpose of facilitating the handling of cable reels and the like.

It is a principal object of the present invention to provide a cable reel handling apparatus adapted for mounting on the chassis of a truck which apparatus is capable of hoisting a large fully wound cable reel from the ground onto the truck and vice versa.

A further object of the present invention is to provide a cable reel handling apparatus which includes a reel supporting platform rotatably mounted substantially over the rear wheels of the truck chassis for enabling alignment of the cable reel hoist means in any desired direction.

A further object of the present invention is to provide controls for a cable reel handling apparatus comprising fluid pressure actuated means for selectively effecting rotation of the reel supporting platform, elevation of the reel hoist means and operation of the cable reel drive means.

With the foregoing objects in mind, numerous other objects and numerous advantages of the present invention will become apparent from the following detailed description thereof when read in conjunction with the accompanying drawings wherein:

Fig. 2 is a top plan view of the cable reel handling apparatus shown mounted on the truck chassis in Fig. 1;

Fig. 3 is a side elevation view showing the structural elements of the cable reel handling apparatus somewhat fragmentarily and illustrating the location of the fluid pressure supply lines;

Fig. 4 is a schematic view showing further details of the fluid pressure supply lines which actuate the hydraulic cylinders and pistons and fluid pressure actuated motor for driving the cable reel drive means;

Fig. 5 is an enlarged detailed sectional view taken substantially along the line 5—5 in Fig. 1 and Fig. 6 and looking in the direction of the arrows and illustrates the transmission mechaism included in the cable drive means;

Fig. 6 is a view taken substantially along the line 6—6 in Fig. 5 and looking in the direction of the arrows and illustrating further details of the cable drive transmission; and Fig. 7 is a schematic view showing the fluid pressure control circuit.

Figure 1:
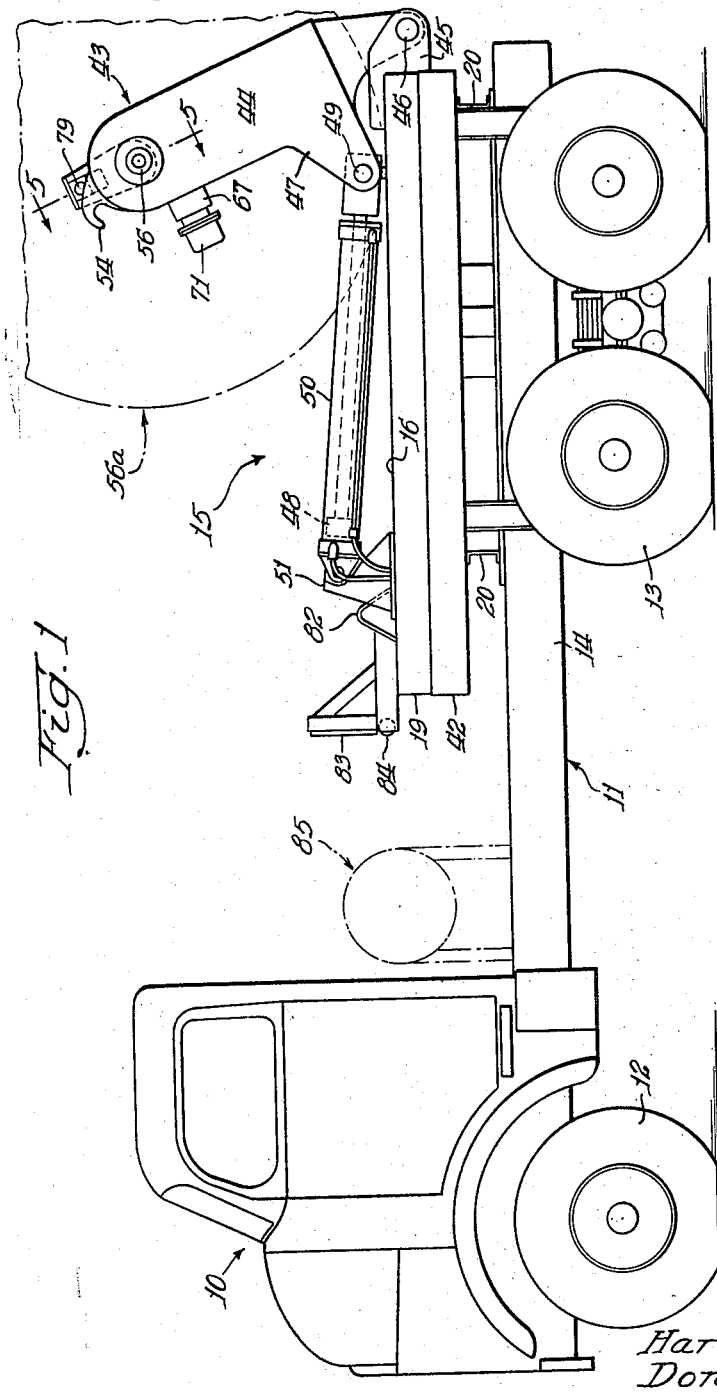
Fig. 1 is a side elevation view showing a truck chassis with the cable reel handling apparatus comprising the subject matter of the present invention mounted thereon.

With reference now to the drawings, wherein like reference numerals have been used in the different views to identify identical parts, the invention comprises a truck designated generally by reference numeral 10, having a chassis 11 including front steering wheels 12 and rear driving wheels 13. The chassis 11 also includes longitudinally extending support members 14 on which is mounted the cable reel handling mechanism designated generally by reference numeral 15.

The cable reel handling mechanism 15 comprises a platform 16 which is mounted on the chassis 11 in the general area above the driving wheels 13. The platform 16 comprises a substantially flat floor member 17 and suitable strengthening vertical members 18 and 19. The elongated members 14 of the chassis 11 have horizontally extending frame members 20 secured thereto and these frame members 20 have strengthening members 21 secured thereto for providing adequate strength to support the platform 16. The supporting members 21 also have suitable upstanding strengthening cylindrical members 22 fastened thereto and rigidly secured to a base plate 23 is an upstanding inner bearing sleeve member 24.

The platform 16 is provided with a strengthening web 25 and with a central flat member 26 which is integrally secured to an external bearing sleeve member 27 disposed around the external bearing member 24. In order to retain the platform 16 against vertical movement with respect to the chassis, a holding ring 28 is bolted to internal bearing sleeve 24 by means of a plurality of bolts 29. The platform 16 is provided with a central aperture having horizontally extending lips 30 provided for holding a cover plate 31.

In order to facilitate rotation of the platform 16 on the members 20, the latter are provided with a plurality of roller devices 32 comprising supporting lugs 33 fastened directly to the top of the support member with rollers 34 adapted to have a horizontal portion 35 of platform 16 rest directly thereon. Thus, it will be seen that the platform 16 may be rotated with the concentric bearing sleeves 24 and 27 serving as a bearing element and the rollers 34, which are disposed in the vicinity of the periphery of the platform 16, functioning to support the mass of the platform 16.

In order to effect rotation of the platform 16, a fluid pressure actuated piston 36 and cylinder 37 are provided. The cylinder 37 is suitably fixed to the supporting member 20 by means of a pivot pin 38 while the piston 36 is fixed to the platform 16 by means of a pivot pin 39 which extends through the end of the piston rod 40 and through a pair of lugs 41 disposed on one side of the cylindrical bearing element 27. Means are provided for admitting fluid into the cylinder 37 on one side or the other of the piston 36 in order to effect rotation of the platform 16 in either a counter clockwise or a clockwise direction about bearing sleeves 24 and 27 as a pivot.

The platform 16 is provided with depending apron members 42 for preventing dirt, etc., from getting into the supporting roller mechanism and into the fluid pressure supply lines.

The platform 16 is provided at its rear end with suitable hoist mechanism, designated generally by reference numeral 43. The hoist mechanism 43 comprises a pair of arms 44 pivotally mounted by means of rearwardly extending lugs 45 and a transversely extending pivot shaft 46 extending through the arms 44 and through suitable apertures in the rearwardly extending lugs 45. Each of the arms 44 has a projecting portion 47 to which a piston 48 is pivotally secured by means of suitable pivot pins 49. The pistons 48 are reciprocable within suitable cylinders 50 and each of the cylinders 50 is pivotally secured to the platform 16 by means of upstanding lugs 51 rigidly mounted on the top of the platform 16. Thus, upon movement of the pistons 48 to the right (Fig. 1) within the cylinders 50, the hoist arms 44 are caused to pivot in a clockwise direction about their supporting pivot shaft 46. Admission of fluid under pressure into the cylinders 50 on the left side of pistons 48 therefore causes clockwise or downward movement of the hoist arms 44, whereas the admission of fluid under pressure into the cylinders on the right side of pistons 48 causes the hoist arms 44 to pivot in a counter clockwise or elevating direction about their pivot shaft 46.

With reference more particularly to Figs. 5 and 6, the structural details of the hoist arms 44 will now be described in greater detail. Each of the hoist arms 44 comprises a box-like structural steel member having outer and inner walls 52 and 53 and a hook-like element 54 is secured to each of the arms 44 by means of suitable bolts 55 extending through walls 52 and 53. The purpose of the hooks 54 will be described hereinafter.

Each of the arms 44 is provided with suitable openings therein for the purpose of receiving a hollow sleeve shaft 56 through which a suitable cable reel supporting shaft may be inserted in order to support a cable reel 56a between the arms 44. The hollow cable reel supporting shaft 56 is rotatably mounted within the arms 44 by means of suitable roller bearings 57 which act between races 58 and 59 respectively secured to the shaft 56 and to a pair of mounting inserts 60 and 61 which retain the shafts 56 in axially fixed positions within arms 44. A pair of sealing members 62 are provided for each of the shafts 56 in order to retain lubricant on the bearings 57.

One of the shafts 56 has a bevel gear 63 splined thereon, as indicated at 64, and a meshing bevel gear 65 formed on the end of a shaft 66 disposed substantially at right angles to shaft 56 is provided for driving the bevel gear 63 and shaft 56.

The one arm 44 provided with bevel gear 63 on shaft 56 is formed with a sleeve portion 67 for receiving a bearing sleeve 68 in order to rotatably mount the shaft 66 therein. The bearing sleeve 68 and the shaft 66 are respectively provided with races for bearing members 69 in order to hold the shaft 66 in axially fixed relation with respect to the bearing sleeve 68. The bearing sleeve 68 is held within sleeve portion 67 of arm 44 by means of a plurality of bolts 68' and a collar-like portion 70 for providing a mounting for a motor 71 is fixed to the sleeve portion 67 by means of a plurality of bolts 72. The motor 71 is fixed to the collar member 70 by means of a plurality of bolts 73.

The motor 71 may be of any conventional type adapted to be driven by fluid under pressure and in one operative embodiment of the present invention, a conventional fluid pressure actuated motor of the reversable type was used and found to function most satisfactorily. In other words, the motor 71 is provided with two fluid pressure exits or entrances and when the fluid under pressure is supplied through one of them and drained off through the other the motor rotates in one direction and when the fluid under pressure is supplied through the other and drained off through the one, the motor rotates in the opposite direction of rotation.

In order to complete the drive from the motor 71 to a reel 56a mounted upon a shaft extending through the sleeves 56 and through the reel 56a, an arm 74 is bolted to the one sleeve 56 by means of a plurality of bolts 75. The arm 74 is provided with a bifurcated end portion 76 formed with elongated grooves 77 for receiving a slidable member 78 therein. A pin 79 is threaded into the member 78 and is adapted to be seated within a suitable opening formed in one of the sides of the cable reel 56a. In order to hold the pin 79 and member 78 in place between the bifurcated end region of arm 74, a stop plate 80 is fixed to the two ends of member 74 by means of bolts 81. It will be seen that the slides 77 provide some adjustability for the position of pin 79 so that cable reels of different sizes may be accommodated by the mechanism. It will be understood that it is conventional practice to have a hole formed in the sides of cable reel spools and that the pin 79 is adapted to be received within such holes. It will be understood also that if the cable reel is substantially narrower than the distance between the two arms 44, all that need be done to accommodate the same is to position one or more spacers around the shaft on which the reel is mounted between the reel and the opposite arm 44.

When the arms 44 are rotated in a clockwise direction from the position shown in Fig. 1, the hooks 54 open upwardly and in the event that it is only desired to move a cable reel a short distance from one location to another, a shaft may be inserted through the center of the cable reel and hooks 54 brought under the ends of the shaft and then raised sufficiently to lift the cable reel off of the ground. The truck is then moved in order to move the cable reel to any desired location.

It will be understood that under certain conditions of operation it will be desired to lift a cable reel 56a onto the platform 16 and then remove the mounting shaft extending through the reel and through arms 44 so as to allow the reel to move forwardly and enable the vehicle to pick up a second cable reel. In order to prevent the cable reel 56a from rolling too far forwardly, an inverted V-shaped member 82 is provided at the forward end of platform 16 and this member functions as a stop for the reel.

When it is desired to wind cable onto reel 56a or to unwind cable from reel 56a, the cable is ordinarily passed from the reel forwardly between a pair of vertically upstanding roller members 83 which are suitably rotatably mounted at the forward end of the platform 16. A horizontal roller 84 extends between vertical rollers 83 so as to provide little or no resistance to moving the cable onto or off of the cable reel 57.

In cable laying operations it often becomes necessary to have a winch mechanism in order to facilitate pulling the cable when necessary. The truck 10 is provided with a suitable winch mechanism 85 comprising winding reels 85' on opposite sides of the vehicle for enabling utilization of the winch 85 irrespective of whichever side of the vehicle it is most convenient to work from.

With particular reference to Fig. 3, 4 and 7, the hydraulic control system for operating the fluid pressure actuated pistons and cylinders and the reel drive motor will now be described in detail. It will be noted from Fig. 3 that several of the fluid pressure supply lines extend through the concentric bearing sleeves 24 and 27 and this has been found to simplify the maintenance of the supply lines and the operation of the cable handling vehicle as a whole, as the fluid pressure supply lines are kept out of the way and are thus not so likely to be damaged as would be the case if they were all exposed and thereby apt to be struck during use of the vehicle.

The hydraulic system includes a fluid reservoir 86, a fluid pressure pump 87, a relief valve 88 and a filter 89, all of which elements may be suitably located at any desired position on the truck chassis 11. The fluid circuit also includes three manually operable control valves 90, 91 and 92, each of which is a conventional type of valve having three positions. Inasmuch as it is desired that all of the functions to be performed by the fluid pressure actuated pistons and cylinders and the fluid pressure actuated motor 71 should be reversible, the valves are movable to one position to effect operation of the fluid pressure actuated means in one direction and to another position to effect operation of the fluid pressure actuated means in the opposite direction. Each of the valves also has a hold position in which the fluid pressure is not directed at all to the fluid pressure actuated means controlled thereby.

The fluid pump 87 is connected by means of a conduit or fluid pressure supply line 93 with the manual valve 90 for controlling the elevation of the hoist arms 44. The pump 87 draws fluid from the reservoir 86 through a conduit 94, and, of course, the fluid pressure output through conduit 93 is under pressure in the event one of the manual valves 90, 91 or 92 is moved to an actuated position. A fluid supply conduit 95 leading from the reel drive motor control valve 92 connects with the reservoir 86 and is provided with a filter 89 therein for keeping the oil utilized in the system free from contamination. The relief valve 88 is disposed in a conduit 96 which connects fluid pressure supply line 93 with conduit 95 so as to prevent a build up of pressure in supply lines 93 above a predetermined maximum value.

It will be understood that the valves 90, 91 and 92 are of conventional construction and that each of them is provided with four fluid ports, one of the ports being for the purpose of admitting fluid under pressure to the valve, another being for the purpose of directing fluid under pressure from the valve and the other two ports leading respectively to opposite fluid supply lines connected with the fluid pressure actuated means controlled by the valve.

The hoist arm control valve 90 is provided with a port 97 with which the fluid pressure line 93 is connected, with a port 98 with which a fluid supply line 99 is connected, and ports 100 and 101 respectively connected with fluid pressure supply lines 102 and 103 connected with hoist arm actuating cylinders 50. Each of the lines 102 and 103 is respectively provided with flow control valves 104 and 104 for limiting the rate of flow of fluid therethrough in the direction indicated by the arrow associated with the respective control valves 104 and 105. The fluid pressure supply line 99 connects with a port 106 and the valve 91 is also provided with a port 107 connected with a supply conduit 108 leading to valve 92, and with a pair of ports 109 and 110 respectively connected with conduits 111 and 112 which lead to the opposite ends of platform rotation control cylinder 37 and piston 36.

The conduit 108 connects with a port 113 associated with valve 92 and this valve is also provided with ports 114 connected with fluid return line 95, and a pair of ports 115 and 116 respectively connected with fluid supply lines 117 and 118 leading to the motor 71 for driving the cable reel 57 mounted between arms 44. Each of the valves 91, 92 and 93 and the motor 71 are provided with bleed ports connected with a bleed line 119 which leads directly to the reservoir 86. The bleed line 119 is for the purpose of draining fluid which leaks around the valves and through the motor.

It will be noted that each of lines 102, 103, 95 and 108 extend through the concentric bearing sleeves 24 and 27 and connect with a fluid conduit junction block 120 fastened on the under side of cover 31. The junction block 120 merely forms a convenient manner of connecting the fluid supply lines beneath the platform 16 and facilitates examination and maintenance of the fluid supply lines. By having the supply lines pass through the cylindrical sleeves 24 and 27, they are thereby retained in a position where they are least likely to become damaged due to their being struck by foreign objects. Also, by providing the junction block 120 which rotates with the platform 16, there is a minimum amount of flexing necessary in the fluid supply lines upon rotation of the platform 16. The fluid supply lines 117 and 118 extend from valve 92 along the edge of the platform 16 and then pass through suitable openings in the rear end of the platform and extend to motor 71. Likewise, the bleed line 119 is mounted adjacent fluid supply lines 117 and 118.

The operation of the fluid control circuit and cable reel handling apparatus will now be described. With the valves 90, 91 and 92 each in their intermediate or hold position, as shown in Fig. 7, the fluid pumped by the pump 87 merely passes through conduits 93, 99, 108 and 95 back to the reservoir 86. In the event that it is desired to cause the arms 44 to pivot in a counter clockwise or elevating direction, the valve 90 is moved to the left (Fig. 7) and this causes ports 97 and 100 to be interconnected and ports 98 and 101 to be interconnected. Fluid under pressure then is supplied from pump 87 through line 93, port 97, port 100 and line 102 to the right sides of cylinders 50, thereby causing the pistons 48 therein to move to the left in order to lift or elevate the hoist arms 44. At this same time fluid within cylinders 50 on the left sides of pistons 48 bleeds back to the reservoir 86 through conduit 103, port 101, port 98, conduit 99, port 106, port 107, conduit 108, port 113, port 114, conduit 95 and filter 89.

When it is desired to effect downward or clockwise movement of hoist arms 44 the manual control valve 90 is moved to its right hand position so as to interconnect the ports 97 and 101 and to interconnect ports 98 and 100. Under these conditions the fluid pressure supplied by the pump 87 passes through conduit 93, ports 97 and 101 and conduit 103 to the left hand ends of cylinders 50 so as to cause the pistons 48 therein to move to the right and thereby pivot the hoist arms 44 in a clockwise or descending direction. Fluid from the right ends of cylinders 50 is bled back to the reservoir 86 to conduit 102, ports 100 and 98, conduit 99, ports 106 and 107, conduit 108, ports 113 and 114, conduit 95 and filter 89.

Whenever it is desired to effect rotation of the platform 16, the manual control valve 91 is moved into its leftward or rightward position in order to respectively effect clockwise rotation or counter clockwise rotation of the platform 16. Movement of valve 91 to the leftward position interconnects ports 106 and 109 and interconnects 107 and 110. At this time fluid under pressure supplied by the pump 87 passes through the conduit 93, ports 97 and 98, (it being assumed at this time that the control valve 90 is in its intermediate or hold position), conduit 99, ports 106 and 109 and line 111 to the right hand end of cylinder 37. This causes the piston 36 to move to the left (Fig. 7) in order to effect clockwise rotation of the platform 16. Fluid from the left end of cylinder 37 is bled back to the reservoir 86 through conduit 112 and the one-way control valve therein, through ports 110 and 107, conduit 108, ports 113 and 114, conduit 95 and filter 89.

If it is desired to effect counter clockwise rotation of the platform 16, the valve 91 is moved to its right hand position whereupon ports 106 and 110 are interconnected and ports 108 and 109 are interconnected. Under these conditions fluid under pressure supplied by the pump 87 passes through conduit 93, ports 97 and 98, conduit 99, ports 106 and 110, and conduit 112 to the left hand end of cylinder 37 so as to move the piston 36 to the right and effect counter clockwise movement of the platform 16. Fluid is bled from the right end of cylinder 37 through conduit 111 and the flow control valve disposed therein, ports 109 and 107, conduit 108, ports 113 and 114, conduit 95 and filter 89 back to the reservoir 86.

It will be recalled that the motor 71 is a reversable motor adapted to rotate in one direction of rotation when fluid is supplied thereto under pressure through conduit 117 and to rotate in the opposite direction of rotation when fluid under pressure is supplied thereto through conduit 118. For the purposes of the present disclosure it will be assumed that the movement of the cable reel drive control valve 92 to the left corresponds to clockwise rotation of the motor shaft 66 and that movement of the valve 92 to the right corresponds to counter clockwise rotation of the motor shaft 66. With the valve 92 in its leftward position, ports 113 and 115 are interconnected while ports 116 and 114 are interconnected. Under these conditions fluid under pressure supplied by the pump 87 passes through conduit 93, ports 97 and 98, conduit 99, ports 106 and 107, conduit 108, ports 113 and 115, and conduit 117 to the motor 71. Fluid is bled from the motor 71 through conduit 118, ports 116 and 114, conduit 95 and filter 89 back to reservoir 86. As the valve 92 is moved to the right hand position in order to interconnect ports 113 and 116 and interconnect ports 114 and 115, fluid under pressure is supplied from pump 87 through conduit 93, ports 97 and 98, conduit 99, ports 106 and 107, conduit 108, ports 113 and 116, and conduit 118 to motor 71 in order to effect counter clockwise rotation of the motor shaft 66. Under these same conditions fluid is drained from the motor 71 to conduit 117, ports 115 and 114, conduit 95 and filter 89 back to reservoir 86.

In the foregoing description of the operation of the controls, it will be noted that in each instance it has been assumed that only one of the functions of the reel handling apparatus would be desired to be performed at one time. It will be readily understood that, if desired, the control system could be arranged so that with sufficient fluid under pressure any or all of the functions of the cable reel handling apparatus could be carried out simultaneously namely, the hoist arms could be lifted, the platform or table 16 rotated and the motor 71 driven simultaneously.

From the foregoing description of the present invention it will be apparent that it provides an improved cable reel handling apparatus and, particularly, by having the fluid pressure supply lines so that they extend through the cylindrical platform bearings in order to keep them from any unnecessary damage, and by providing the compact and simple transmission mechanism between the cable drive motor 71 and the cable drive crank arm 74, the overall operation and efficiency of the cable reel handling apparatus is improved. It is contemplated that numerous changes and modifications may be made in the present invention without departing from the spirit or scope thereof.

What is claimed is:

1. Apparatus for handling cable reels and the like comprising, in combination, a truck having a chassis including rear wheels, a reel supporting platform disposed on said chassis generally over the rear wheels, means for rotatably mounting said platform on said chassis, said mounting means including concentric bearing sleeve members respectively secured to said chassis and said platform and a plurality of roller devices mounted on said chassis for directly supporting the platform at spaced points in the vicinity of the periphery of the platform, hoist means adapted to lift a cable reel and pivotally mounted at the rear end of said platform, a first fluid pressure actuated means disposed on top of said platform for elevating and lowering the hoist means in order to lift a cable reel fastened to the hoist means from the ground behind the truck onto the platform and vice versa, a second fluid pressure actuated means disposed beneath said platform for rotating the platform between predetermined angular limits relative to the chassis to thereby enable alignment of the hoist means in any desired position afforded by the angular limits of movement of the platform, a source of fluid pressure, fluid pressure supply lines interconnecting said source and said fluid pressure actuated means, the supply lines leading to said first fluid pressure actuated means extending through said bearing sleeve members, and valve means disposed in said supply lines for controlling the supply of fluid pressure to said first and second fluid pressure actuated means and thereby controlling the angular position of said platform and the operation of said hoist means.

2. Apparatus for handling cable reels and the like comprising, in combination, a truck having a chassis including rear wheels, a reel supporting platform disposed on said chassis generally over the rear wheels, means for rotatably mounting said platform on said chassis, said mounting means including concentric bearing sleeve members respectively secured to said chassis and said platform and a plurality of roller devices mounted on said chassis for directly supporting the platform at spaced points in the vicinity of the periphery of the platform, hoist means adapted to lift a cable reel and pivotally mounted at the rear end of said platform, a first fluid pressure actuated means disposed on top of said platform for elevating and lowering the hoist means in order to lift a cable reel fastened to the hoist means from the ground behind the truck onto the platform and vice versa, a second fluid pressure actuated means disposed beneath said platform for rotating the platform between predetermined angular limits relative to the chassis to thereby enable alignment of the hoist means in any desired position afforded by the angular limits of movement of the platform, cable reel drive means associated with said hoist means for rotating a cable reel fastened to the hoist means, a third fluid pressure actuated means for driving said cable driving means, a source of fluid pressure, fluid pressure supply lines interconnecting said source with all of said fluid pressure actuated means, the supply lines leading to said first and third fluid pressure actuated means extending through said bearing sleeve members, and valve means disposed in said supply lines for controlling the supply of fluid pressure to each of the fluid pressure actuated means and thereby controlling the angular position of the platform, the elevation of the hoist means and the rotation of the cable reel drive means.

3. Apparatus for handling cable reels and the like comprising, in combination, a truck having a chassis including rear wheels, a reel supporting platform disposed on said chassis generally over the rear wheels, means for rotatably mounting said platform on said chassis, said mounting means including an upwardly extending cylindrical sleeve member secured to said chassis and a downwardly extending sleeve member mounted on said platform and concentrically disposed around said first sleeve member and a plurality of roller devices mounted on said chassis for directly supporting the platform at spaced points in the vicinity of the periphery of the platform, a fluid pressure operated piston and cylinder respectively connected with said platform and chassis for rotating the platform between predetermined angular limits relative to the chassis to thereby enable alignment of the hoist means in any desired position afforded by the angular limits of movement of the platform, hoist means adapted to lift a cable reel and comprising a pair of arms pivotally mounted at the rear end of said platform, a pair of fluid pressure actuated piston and cylinders respectively connected with said hoist arms and said platform for elevating and lowering the hoist arms in order to lift a cable reel fastened to the hoist arms from the ground behind the truck onto the platform and vice-versa, a source of fluid pressure, fluid pressure supply lines interconnecting said source and the respective fluid pressure operated pistons and cylinders and valve means disposed in said supply lines for controlling the supply of fluid pressure to the fluid pressure actuated pistons and cylinders and thereby controlling the angular position of the platform and the operation of the hoist means.

4. Apparatus for handling cable reels and the like comprising, in combination, a truck having a chassis including rear wheels, a reel supporting platform disposed on said chassis generally over the rear wheels, means for rotatably mounting said platform on said chassis, said mounting means including an upwardly extending cylindrical sleeve member secured to said chassis and a downwardly extending sleeve member mounted on said platform and concentrically disposed around said first sleeve member and a plurality of roller devices mounted on said chassis for directly supporting the platform at spaced points in the vicinity of the periphery of the platform, a fluid pressure operated piston and cylinder respectively connected with said platform and chassis for rotating the platform between predetermined angular limits relative to the chassis to thereby enable alignment of the hoist means in any desired position afforded by the angular limits of movement of the platform, hoist means adapted to lift a cable reel and comprising a pair of arms pivotally mounted at the rear end of said platform, a pair of fluid pressure actuated pistons and cylinders respectively connected with said hoist arms and said platform for elevating and lowering the hoist arms in order to lift a cable reel fastened to the hoist arms from the ground behind the truck onto the platform and vice versa, cable reel drive means mounted on one of said hoist arms and comprising a fluid pressure operated motor, a rotatable arm engageable with a cable reel fastened to the hoist arms in order to rotate the cable reel and a power train including meshing gears for completing a drive from the fluid pressure operated motor to the rotatable cable reel drive arm, a source of fluid pressure, fluid pressure supply lines interconnecting said source and said fluid pressure operated pistons and cylinders and the fluid pressure operated motor, and valve means disposed in said supply lines for controlling the supply of fluid pressure to the fluid pressure actuated pistons and cylinders and fluid pressure actuated motor and thereby controlling the angular position of the platform, the elevation of the hoist means and the operation of the cable reel drive means.

5. Apparatus for handling cable reels and the like comprising, in combination, a truck having a chassis including rear wheels, a reel supporting platform disposed on said chassis generally over the rear wheels, means for rotatably mounting said platform on said chassis, said mounting means including an upwardly extending cylindrical sleeve member secured to said chassis and a downwardly extending sleeve member mounted on said platform and concentrically disposed around said first sleeve member and a plurality of roller devices mounted on said chassis for directly supporting the platform at spaced points in the vicinity of the periphery of the platform, a fluid pressure operated piston and cylinder respectively connected with said platform and chassis for rotating the platform between predetermined angular limits relative to the chassis to thereby enable alignment of the hoist means in any desired position afforded by the angular limits of movement of the platform, hoist means adapted to lift a cable reel and comprising a pair of arms pivotally mounted at the rear end of said platform, a pair of fluid pressure actuated pistons and cylinders respectively connected with said hoist arms and said platform for elevating and lowering the hoist arms in order to lift a cable reel fastened to the hoist arms from the ground behind the truck onto the platform and vice versa, cable reel drive means mounted on one of said hoist arms and comprising a fluid pressure operated motor, a rotatable arm engageable with a cable reel fastened to the hoist arms in order to rotate the cable reel and a power train including meshing gears for completing a drive from the fluid pressure operated motor to the rotatable cable reel drive arm, a source of fluid pressure, fluid pressure supply lines interconnecting said source and said fluid pressure actuated pistons and cylinders and the fluid pressure operated motor, and valve means comprising selectively positionable valves for providing alternative operation of any of the fluid pressure actuated means to thereby control the supply of fluid thereto and in turn control the angular positions of the platform, elevation of the hoist arms and operation of the cable reel drive means.

6. Apparatus for handling cable reels and the like comprising, in combination, a truck having a chassis including rear wheels, a reel-supporting platform disposed on said chassis generally over the rear wheels, means for rotatably mounting said platform on said chassis, a fluid-pressure operated piston and cylinder connected with said platform and chassis for rotating the platform between pre-determined angular limits relative to the chassis to thereby enable alignment of the hoist means in any desired position afforded by the angular limits of movement of the platform, hoist means adapted to lift a cable reel and comprising a pair of arms pivotally mounted on said platform, a pair of fluid pressure actuated pistons and cylinders respectively connected with said hoist arms and said platform for elevating and lowering the hoist arms in order to lift a cable reel, cable reel drive means mounted on one of said hoist arms comprising a fluid pressure operated motor, a rotatable cable reel drive arm connected to the hoist arm and engageable with a cable reel in order to rotate the cable reel and a power train including gearing for completing a drive from the fluid pressure operated motor to the rotatable cable reel drive arm, a source of fluid pressure, fluid pressure supply lines interconnecting said source and said fluid pressure operated pistons and cylinders and the fluid pressure operated motor, and valve means disposed in said supply lines for controlling the supply of fluid pressure to the fluid pressure actuated pistons and cylinders and fluid pressure actuated motor and thereby controlling the angular position of the platform, the elevation of the hoist means and the operation of the cable reel drive means.

References Cited in the file of this patent

UNITED STATES PATENTS

| | | |
|---|---|---|
| 1,921,233 | Kuchar | Aug. 8, 1933 |
| 1,949,481 | Koller | Mar. 6, 1934 |
| 2,613,822 | Stanley | Oct. 14, 1952 |
| 2,677,476 | Bebinger | May 4, 1954 |
| 2,776,764 | Palmleaf | Jan. 8, 1957 |